United States Patent [19]

Aftergut et al.

[11] 4,143,947
[45] Mar. 13, 1979

[54] METHOD FOR IMPROVING THE RESPONSE TIME OF A DISPLAY DEVICE UTILIZING A TWISTED NEMATIC LIQUID CRYSTAL COMPOSITION

[75] Inventors: Siegfried Aftergut, Schenectady; Herbert S. Cole, Jr., Scotia, both of N.Y.

[73] Assignee: General Electric Company, Schenectady, N.Y.

[21] Appl. No.: 879,367

[22] Filed: Feb. 21, 1978

Related U.S. Application Data

[63] Continuation of Ser. No. 697,982, Jun. 21, 1976, abandoned.

[51] Int. Cl.² .............................................. G02F 1/13
[52] U.S. Cl. .................................... 350/334; 350/350; 252/299
[58] Field of Search ...................... 350/350, 346, 334; 252/299

[56] References Cited

U.S. PATENT DOCUMENTS

| | | | |
|---|---|---|---|
| 3,650,603 | 3/1972 | Heilmeier et al. | 350/346 |
| 3,806,230 | 4/1974 | Haas | 350/346 |
| 3,891,307 | 6/1975 | Tsukamoto et al. | 350/333 |
| 3,975,286 | 8/1976 | Oh | 350/350 X |

OTHER PUBLICATIONS

Klanderman et al., "Novel Stable Chiral Nematic (Choleoteric) Liquid Crystals", *Journal of the American Chemical Society*, Mar. 19, 1975.

*Primary Examiner*—Edward S. Bauer
*Attorney, Agent, or Firm*—Geoffrey H. Krauss; Joseph T. Cohen; Marvin Snyder

[57] ABSTRACT

A method for improving the decay time of a display device utilizing a twisted nematic liquid crystal composition by the addition of a controlled amount of optically active material to produce a natural pitch, under field-free conditions, shorter than four times the thickness of the display device cell.

6 Claims, 5 Drawing Figures

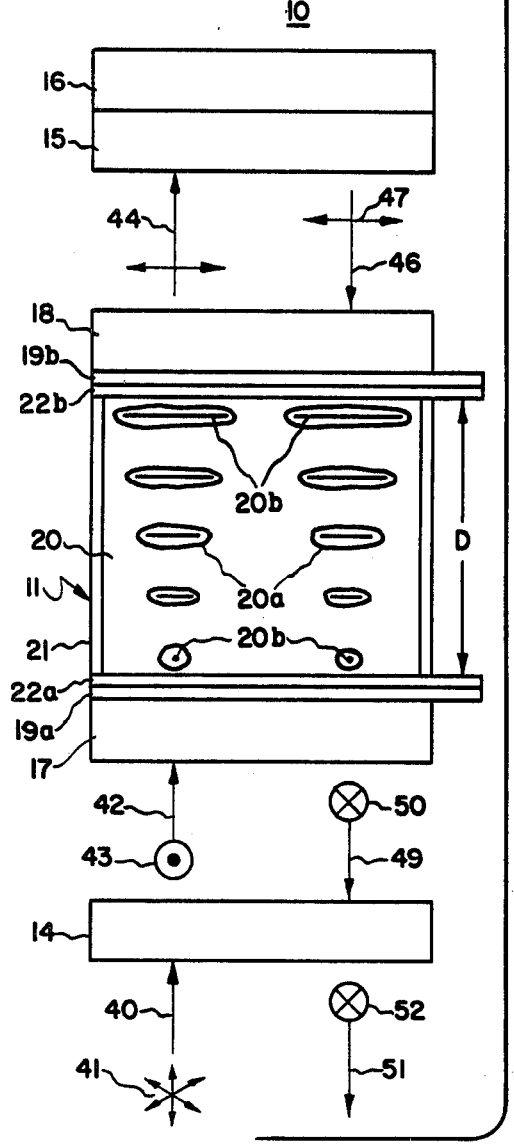
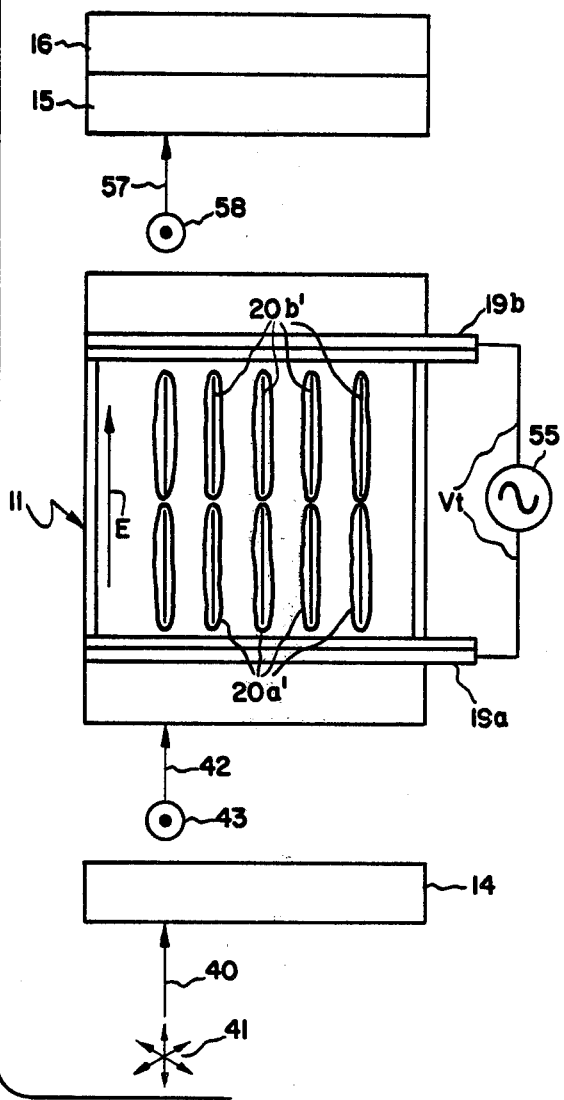
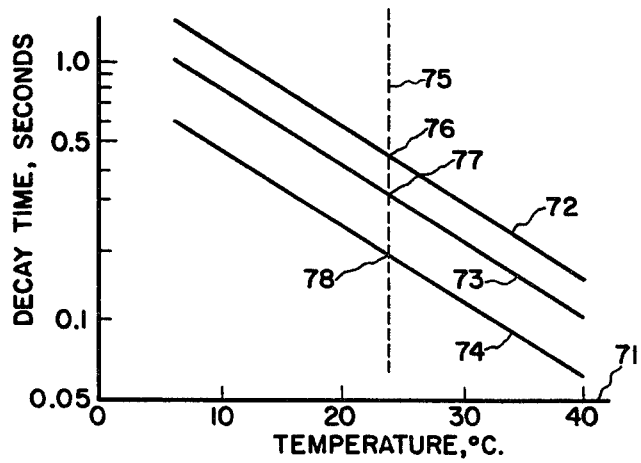

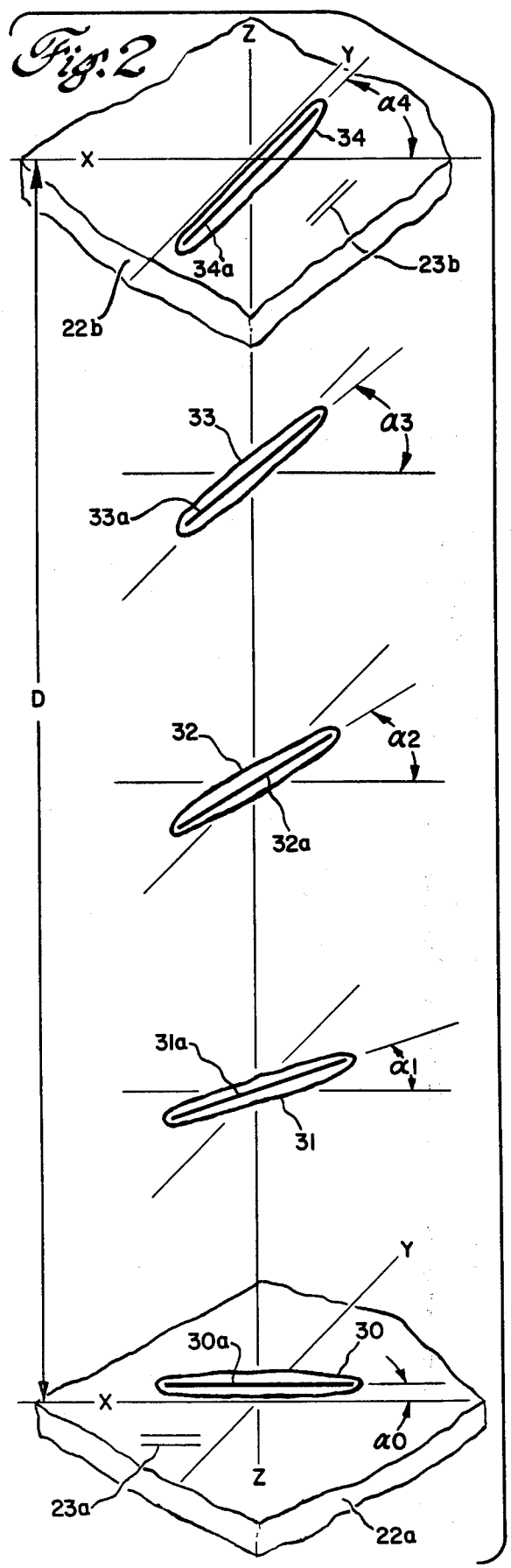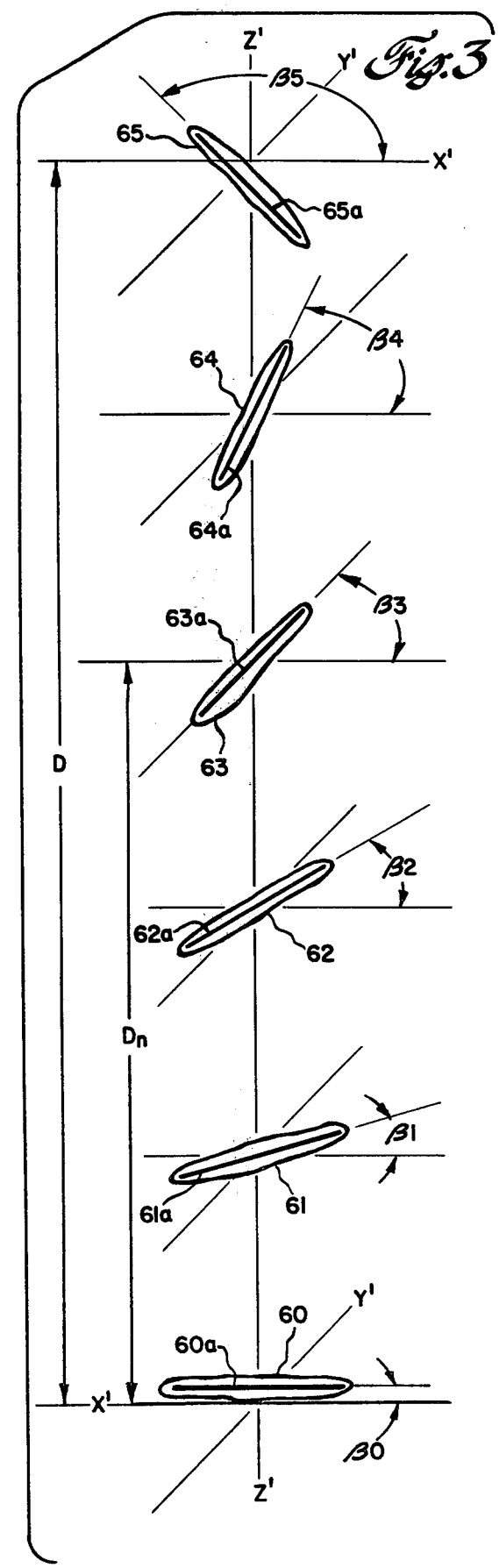

METHOD FOR IMPROVING THE RESPONSE TIME OF A DISPLAY DEVICE UTILIZING A TWISTED NEMATIC LIQUID CRYSTAL COMPOSITION

This is a continuation, of application Ser. No. 697,982, filed June 21, 1976 now abandoned.

BACKGROUND OF THE INVENTION

The present invention relates to liquid crystal compositions for display devices and, more particularly, to a novel method for improving the decay time of a twisted nematic liquid crystal composition for use therein.

Display devices utilizing liquid crystal compositions of the nematic type are known to have relatively slow response speed, typically of the order of milliseconds, as compared to other display devices, such as light emitting diodes and the like, which respond in microseconds. It is known that the rise and decay times for a liquid crystal composition can be controlled electrically, by adjustment of the magnitude of the voltage applied to form a field switching the liquid crystal composition between its transmissive and absorptive states. Liquid crystal display devices desirably have low power requirements; in applications, such as watch displays and the like, wherein limited power is available, the circuitry driving the display device between its transmissive and absorptive states is typically simplified to even further minimize power drain by relying upon the spontaneous relaxation of the liquid crystal composition for the return of that composition to the unactivated state. Thus, the rise time to the desired light-transmissivity state is typically controlled by the magnitude of the applied driving voltage, while the decay time depends solely upon the spontaneous relaxation time of the liquid crystal composition itself.

A method is desirable for improving the decay time of twisted nematic liquid crystal compositions utilized in a display device, whereby the simplified drive circuitry (driving the display device for rise time transitions only) is retained.

BRIEF SUMMARY OF THE INVENTION

In accordance with the invention, a method for improving the decay time of a display device using a twisted nematic liquid crystal composition comprises the steps of: providing a display cell having a selected separation distance between the facing interior surfaces of the substrates thereof; filling the volume defined between the separated facing interior surfaces of said cell with a quantity of nematic liquid crystal composition; and adding a controlled amount of an optically active additive to the nematic liquid crystal composition to render the natural pitch thereof larger than the separation distance but smaller than four times that distance. Suitable optically-active additives include cholesteryl nonanoate (CN) and p-cyanophenyl p-act-amylbenzoate, with the effect of the additive on the resulting material pitch of the composition being proportional to the natural pitch of the chiral additive, assuming equal proportion, by weight, of the additive. Typical amounts of the additive are 0.1-5% by weight, of the liquid crystal composition for reductions of the spontaneous decay time by factors of between 2 and 20.

Accordingly, it is one object of the present invention to provide a novel method for improving the spontaneous decay time of a twisted nematic liquid crystal composition.

This and other objects of the present invention will become apparent to those skilled in the art upon consideration of the following detailed description and the drawings.

BRIEF DESCRIPTION OF THE DRAWINGS

FIGS. 1a and 1b are respective side views of a display cell utilizing a twisted nematic liquid crystal composition and a pair of crossed linear polarizers and respectively illustrating the twisted nematic liquid crystal composition in the field-free (transmissive) and the field-applied (absorptive) conditions;

FIG. 2 is an oblique representation of the molecules of a twisted nematic liquid crystal composition illustrating the enforced pitch thereof between parallel substrates;

FIG. 3 is an oblique representation of a nematic liquid crystal composition in an uncontained state after application of the method of the present invention and illustrating the natural pitch thereof; and FIG. 4 is a graph illustrating the relationship between temperature and spontaneous decay time $\tau d$ for a nematic liquid crystal composition with varying percentages, by weight, of one optically-active additive.

DETAILED DESCRIPTION OF THE INVENTION

Referring initially to FIGS. 1a, 1b and 2, a display 10 of the reflective type utilizes a cell 11 positioned between a pair of linear polarizers 14, 15 having their axes of polarization essentially perpendicular to one another. A highly reflective member 16 is positioned adjacent the surface of polarizer 15 furthest from cell 11.

Cell 11 comprises a pair of essentially transparent planar substrates 17 and 18, of glass and the like, having their interior facing surfaces parallel to, and spaced from, one another. A substantially transparent conductive electrode 19a, 19b, such as a coating of indium oxide and the like, is formed upon the interior surface of each substrate. A quantity of a positive dielectric anisotropy nematic liquid composition 20 such as a mixture of cyanophenyl benzoate esters known to have a nematic mesophase over the range of 0° C. to +60° C., fills the volume between electrodes 19. The layer of liquid crystal composition 20 has a thickness essentially equal to the distance D between the facing surfaces of electrodes 19. The liquid crystal composition is contained within the cell by means of an appropriate sealing and spacing gasket 21.

As is well known, in the field-free condition (FIG. 1a) the elongated molecules 20a of the nematic liquid crystal composition normally have their long axes 20b, or directors, aligned substantially parallel to each other and to the planes of the substrate interior surfaces. Coatings 22a and 22b, respectively, of a suitable boundary control material, such as silicon oxide and the like, are evaporated upon the facing interior surfaces of respective electrodes 19a and 19b, at incidence angles varying from the normal to the plane surfaces thereof. After deposition of the boundary control coatings 22, substrates 17 and 18 are rotated through an angle of approximately 90° with respect to one another whereby, upon filling the void therebetween with liquid crystal composition 20, the coatings 22 force molecules 20a to align in twisted form, with the directors 20b of the molecules adjacent to the coatings are essentially orthogonal to one another with the remaining molecules therebetween having a helical disposition at progressively greater angles with respect to director molecules adjacent a first electrode 19a and decreasing angular disposition towards the directors of the molecules adjacent to the surface of the remaining electrode 19b.

The natural twist of the nematic composition is such that, in the conventional state, its pitch (the distance between identical director orientations with respect to a reference line when approached from identical directions along the curve of the composition) is substantially greater than the pitch imposed upon the contained composition by conformance thereof to the boundary conditions established by control coatings 22a and 22b. As best seen in FIG. 2, boundary control coatings 22a and 22b have mutually perpendicular orientation lines 23a and 23b, respectively parallel to the respective X and Y axes defining the parallel planes of the coatings. A nematic liquid crystal molecule 30, adjacent to lower coating 22a, is forced to align its director 30a at an angle $\alpha_0$, substantially equal to 0°, with respect to the X axis. Molecules 31-34 have increasingly greater angles $\alpha_1$-$\alpha_4$ (in the counterclockwise direction) between their respective directors 31a-34a and the X axis, as upper coating 22b is approached. Upper-most molecule 34, lying adjacent to upper coating 22b, is similarly forced to align its director 34a at an angle $\alpha_4$ essentially equal to 90° with respect to the X axis whereby director 34a is parallel to both the Y axis and upper coating orientation lines 22b. Thus, molecules 30-34 are twisted through a rotation of 90°. It should be understood that a rotation in the opposite (clockwise) direction is also equally permissible and usable, although the twist of, the "stacks" of molecules should be in the same direction within a single display cell 11, to avoid the appearance of disclinations lines at the boundary of adjacent areas having opposite "handedness" or different total angles of twist. The disclination lines are particularly visible in a twisted nematic cell placed between parallel linear polarizers. It is known to add a very small amount, e.g. 0.05% by weight, of a cholesteric material to the nematic liquid crystal composition to assure uniformity of twist "handedness" in the cell.

In operation, the transmissive condition (FIG. 1a) is obtained when a beam 40 of ambient light, having random polarization vectors 41, is incident upon first linear polarizer 14. A beam 42 of light transmitted through polarizer 14 has polarization vectors 43 lying in a single plane, illustratively into and out of the plane of the drawing. Linearly-polarized light beam 42 passes through transparent substrate 17, electrode 19a and boundary control film 22a to enter the liquid crystal composition 20. Transmission of light through the twisted nematic crystal composition causes a similar helical twist to be imparted to the polarization vector, whereby light beam 44 exiting from cell 11 has its polarization vector 45 aligned parallel to the directors of the liquid crystal molecules closest to upper electrode 19b and, hence, perpendicular to the polarization vector 43 of the light beam 42 passing through lower electrode 19a. Second polarizer 15 has its direction of polarization aligned in a direction parallel to polarization vector 45, whereby light beam 44 passes through second polarizer 15 to reflector 16. Upon reflection and a second passage through second polarizer 15, light beam 46 emerges in a direction returning toward cell 11; and polarization vector 47 of light beam 46 is still aligned in the horizontal direction parallel to the direction of the directors of nematic liquid crystal materials 20a adjacent upper electrode 19b. The polarization vector of the reflected light beam is again rotated by an odd multiple of 90°, to emerge from cell 11 as beam 49 having its polarization vector 50 directed into and out of the plane of the drawing. As this vector is again parallel to the polarization direction of the first polarizer 14, a reflected beam 51 of light (having a horizontal polarization vector 52) is "emitted" from display device 10 and is viewable by an observer stationed below first polarizer 14.

A source 55 (FIG. 1b) is coupled between electrodes 19a and 19b to impress an electric field E in the liquid crystal composition perpendicular to the planes of the substrates. For voltages greater than a threshold voltage $V_t$ of the particular composition, the impressed field causes the molecules of the liquid crystal composition to uncoil from the twisted state, whereby the "field-applied" condition is achieved with all of the molecular directors 20a' now aligned with their directors 20b' substantially perpendicular to the planes of the substrates. Incident light beam 40, having random polarization vectors 41, is still transmitted through first polarizer 14 as beam 42 comprised solely of essentially horizontally polarized light, as indicated by polarization vector 43. As the molecules 21a' are no longer in the twisted configuration, rotation of polarization vector 43 does not take place, whereby light beam 57, exiting from cell 11 towards second polarizer 15, has the essentially same polarization vector 58 as the polarization vector 43 possessed by light beam 42 entering cell 11. As second polarizer 15 transmits only light having a polarization vector in a direction orthogonal to that of polarization vector 58, essentially none of the light energy in beam 57 is transmitted to reflector 16, whereby all of incident light beam 40 appears to be absorbed by cell 11 such that an observer looking into cell 11 from a point below first polarizer 14 views a dark display.

The transition ("rise") time between the transmissive condition of FIG. 1a and the absorptive condition of the FIG. 1b is normally controlled by selection of both the particular nematic liquid crystal composition 20 having a net positive dielectric anisotropy and the magnitude of the voltage of source 55, applied to electrodes 19. Conversely, cell 11 has a decay time $\tau_d$, i.e., the time required for molecules 20a to revert from the director-aligned-perpendicular-to-substrate-surface condition to the twisted, director-parallel-to-substrate-surface condition, which time is normally due only to the spontaneous relaxation of the liquid crystal molecules upon removal of the electric field E.

The spontaneous decay time $\tau_d$ is known to be inversely proportional to the square of the pitch of the nematic helix in the display device:

$$\tau_d = K/p^2$$

where K is a constant relating to the viscosity, effective elasticity, temperature, etc. of the composition. Most liquid crystal compositions have a natural pitch which is either much smaller or much greater than the layer thickness D. Liquid crystal compositions of the first kind, wherein pitch P is much smaller than layer thickness D ($P<D$) are generally derivatives of naturally occurring chloresterols or mixtures of nematic liquid crystal materials with substantial amounts of optically-active additives. These materials have a pitch of at most a few microns, whereby, in the field-free condition, the liquid crystal material has a light scattering focal conic texture; application of an electric field causes the material to undergo a cholesteric-to-nematic transition in which the helix is completely unwound. Display cells utilizing cholesteric liquid crystal materials normally operate in a light-scattering mode. A reflective-mode display cell utilizes materials of the second kind, wherein natural pitch is much larger than the layer thickness, often approaching infinite. The enforced pitch is equal to four times the layer thickness, as the nematic molecules are arranged in a helical configuration by the boundary control coatings; the twist of the helix over distance D is equal to one-quarter of a cycle, hence, the pitch P is equal to four times the surface-to-surface spacing D. The nematic compositions of infinitely long pitch, i.e., no natural twist, have an unacceptably long spontaneous decay time in a twisted-nematic cell.

We have found that the spontaneous decay time $\tau_d$ may be reduced by a factor of 2-20 times by the addition of a controlled amount of an optically-active additive. Particularly, the introduction of a chiral compound, such as chloresterol nonanoate (CN) or p-cyanophenyl p-act-amylbenzoate, act upon ordinary nematic compositions, having infinitely long natural pitch, to impart a helical twist thereto whose natural pitch is inversely proportional to the concentration of the chiral additive.

The addition of a small percentage of optically-active additive causes the natural pitch $P_n$ of the nematic liquid crystal composition to be greater than the substrate separation distance D but less than four times the separation distance. As seen in FIG. 3, the directors 60a-65a of a plurality of molecules 60-65 of the additive-doped liquid crystal material have greater than 90° rotation for the same separation distance D, compared to the composition of FIG. 2. Thus, the lower-most molecule 60 of the stack has its director 60a at an angle $\beta_0$, essentially equal to 0°, with reference to the X' axis, to correspond to molecule 30 of FIG. 2 having its director 30a at an essentially zero angle to the X axis, to allow relative comparison of the twists between the unconfined, natural-twist illustration of FIG. 3 and the confined, quarter-twist illustration of FIG. 2. Similarly, all of molecules 61-65 make increasingly greater angles $\beta_1-\beta_5$ between the directors 61a-65a, respectively, and the X' axis. In particular, a molecule 63, at some distance $D_n$, less than separation distance D, has a twist angle $\beta_3$ essentially equal to 90°, whereas molecule 65 at separation distance D has a twist angle $\beta_5$ greater than 90°, but less than 360°.

As previously mentioned hereinabove, we have found that introduction of a chiral compound, such as CN and the like, into the liquid crystal composition imparts a helical twist thereto with a natural pitch inversely proportional to the concentration of the chiral additive. FIG. 4 is a graph illustrating the decay time, plotted in seconds along ordinate 70, at varying operational temperatures, plotted in degrees Centigrade along abscissa 71, for a twisted nematic cell filled with a particular one of a large variety of liquid crystal compositions, the particular composition here being of cyanophenylbenzoate esters of the type disclosed in U.S. patent application Ser. No. 573,371, filed Apr. 30, 1975, now U.S. Pat. No. 3,984,344, issued Oct. 5, 1976, assigned to the assignee of the present invention and incorporated herein by reference. The decay time $\tau_d$ versus temperature curves are plotted along respective curves 72, 73 and 74 for amounts of chloresterol nonanoate additives of 0%, 0.3% and 0.4%, by weight, respectively at room temperature of approximately 23° C. (line 75). The decay time $\tau_d$ for the liquid crystal ester composition containing 0.0% CN is approximately 0.47 seconds (point 76), with a decrease (point 77) to a decay time of 0.32 seconds for 0.3% CN (natural pitch of approximately 38 microns) and a decay time of 0.19 seconds (point 78) for CN added in the amount of 0.4% by weight of the composition (natural pitch of approximately 27 microns). It is seen that decay time is reduced by the addition of an optically-activate additive to about 40% of the decay time for the "pure" liquid crystal composition. While the above figures were obtained for a cell separation distance D of 12.5 microns, it should be understood that similar results are achieved for other separation distances provided that the natural pitch of the liquid crystal composition is greater than the separation distance and less than four times the separation distance. Further, similar results are obtainable with other liquid crystal compositions having a net positive dielectric anisotropy, such as the E7 biphenyl liquid crystal composition manufactured by British Drug House: a "pure" sample (i.e. without the optically-active additive) of the E7 biphenyl composition yields a decay time of approximately 0.18 seconds at 23° C. in a 12.5 micron thick cell; the addition of 0.3% CN thereto reduces the decay time to approximately 0.12 seconds, all other conditions being identical. It should also be understood that all decay times herein described are inclusive of any delay time after "turn-off" triggering of the source 55.

We have further found that a range of approximate 0.1%-0.5% cholesterol nonanoate effects reasonable reductions in decay time, with the initial 0.48 second decay time of undoped cyanophenylbenzoate ester liquid crystal composition decreasing to approximately 0.43 seconds for 0.1% CN and to about 0.10 seconds for 0.5% CN, at equal temperatures and with the same separation distances.

We have also utilized a different chiral additive, the optically-active compound p-cyanophenyl p-act-amylbenzoate to similarly shorten the decay time. This compound has somewhat greater "twisting power" and therefore requires a somewhat smaller concentration to effect the same decrease in decay time.

We have also found that, although decay time continues to decrease with decreasing pitch and, therefore, increasing amounts of the same optically-active additive (with decreasing natural pitch being proportionally imparted to the liquid crystal compositions by chiral additives having decreasing natural pitch as measured in a "pure" state before being added to the liquid crystal composition), a practical limit is reached for twisted nematic display cells by the appearance of a focal conic texture in the field-free condition. This texture scatters and depolarizes light which is transmitted through the cell and tends to make the operation of the twisted nematic display device ineffective. In the case of CN, the focal conic texture tends to appear when the concentration is greater than 0.5%, placing an upper limit on the concentration of chloresterol nonanoate usable.

It is known that, if the surface-to-surface separation distance D is large enough, the helical twist enforced upon the liquid crystal substance by the orientation of boundary coatings 22 may exceed 90° and, because the directors of the molecules adjacent each of coatings 22 must be orthogonal to one another, the nematic helix will assume a twist angle equal to odd multiples of 90°, i.e. 270°, 450°, etc.

We have further found that utilization of a cell having a spacing distance D between the facing interior surface of substrates sufficient to impose a 270° twist on the mixture of liquid crystal compound and optically-active additive tends to even further decrease the decay time, e.g. a cell having 0.3% CN, which exhibits a decay time of approximately 0.25 seconds for a 10 micron spacing (90° twist), will exhibit a spontaneous decay time of approximately 0.1 seconds for a 20 micron spacing (270° twist), which 20 micron spaced cell yields a decay time of about 1.6 seconds (about 12 times greater) for 0.0% additive. Further, a mixture comprising 0.4% by weight of chloresterol nonanoate in the cyanophenylbenzoate ester liquid crystal composition has been found to exhibit a substantially constant decay time of approximately 0.075 seconds (decrease of up to 20 times relative to 0.0% additive) for substrate-to-substrate spacings between approximately 15 and 25 microns, with the additive yielding a 270° twist in the contained molecules of the composition.

We believe the decrease in spontaneous decay time may be explained as follows: a spontaneous relaxation from an activated condition to a twisted field-free condition is driven by elastic torques which depend upon the elastic constants of the material and its pitch. Over a certain range of layer thickness and natural pitch, the twist imposed by the transversely oriented boundary control layers remains constant at 90°. With increasing natural pitch of the liquid crystal composition, the shorter pitch imposed by the boundaries becomes dominating and the decay time approaches the limiting value of the spontaneous decay time of the liquid crystal composition having zero percent additives and, therefore, infinitely long pitch. With decreasing natural pitch, as controlled by increasing amounts by weight of the optically-active dopant, the decay time tends to be dominated by the natural pitch of the doped composition. The decreasing natural pitch tends to cause a continuous and proportional decrease in decay time, were the natural pitch the only controlling factor. However, the orientation coatings upon the substrate walls continue to force the molecules of the liquid crystal composition to maintain a 90° twist which ultimately controls the pitch in the unactivated state. The activated liquid crystal composition, therefore, tends to relax at a rate dictated by its natural pitch but this rate is dampened or cut off during its exponential decrease by the 90° twist, which leads to an effective pitch equal to four times the separation distance D, to decrease the decay time. With increasing separation distances, a separation distance is eventually reached equal to one-quarter of the natural pitch. Further increase in the separation distance dictates that the molecules have a twist greater than 90° and, due to the essentially perpendicular orientation of the coatings, forces the liquid crystal composition to assume a twist having the next greatest odd-multiple of 90°, i.e. 270°. For changes in separation distance over this range, the decay time tends to be substantially constant, as the ratio of pitch to separation distance is small.

While the present invention has been described with specific reference to several liquid crystal compositions having positive dielectric anisotropy and with reference to several optically-active additives, other variations and modifications in content and composition of both the liquid crystal composition and the optically-active additive will now occur to those skilled in the art. In particular, other compounds of the class of cholesterol derivatives, such as cholesterol erucate, the cholesterol halides (cholesterol chloride and the like), cholesterol decanoate and the like, have substantially the same effect on decay time at substantial equal amounts, by weight, as the exemplary cholesterol nonanoate compound; the class of optical active biphenyls, such as the optically-active biphenyl CB15 (Gallard Schleisinger Co.) have substantially the same effect on decay time as the exemplary p-cyanophenyl p-act-amylbenzoate; other optically-active compounds useful for reducing decay time include (—)-3-methylcyclopentane (although up to 5%, by weight, may be required), d-carvone (Eastman Kodak Corp.), and the optically active compounds listed in e.g. Table I of U.S. Pat. No. 3,650,603 and at column 6, line 55 et seq. of U.S. Pat. No. 3,891,307. These compounds are of both the left- and right-handed twisting varieties as "handedness" is apparently immaterial to the utility of an optically-active compound for reduction of decay time by the method set forth hereinabove; "twisting power" and solubility are the prime requisites, e.g. the optically-active compound l-tyrosine methylester has been found to possess insufficient solubility to be of use in the present invention. It is our intention, therefore, to be limited not by the specific disclosure herein, but only by the appending claims.

The subject matter which we consider novel and desire to protect by Letters Patent of the United States is:

1. A method for improving the spontaneous decay time of a nematic liquid crystal display device having a display cell containing a pair of substrates, comprising the steps of:
   spacing the facing interior surfaces of said pair of substrates a selected separation distance apart;
   filling the volume defined between the separated facing interior surfaces of said substrates with a quantity of a nematic liquid crystal composition having only a net positive dielectric anisotropy; and
   dissolving a preselected amount of an optically-active additive, selected from the group consisting of (—)-methylcyclopentane and d-carvone, in said liquid crystal composition to render the natural pitch thereof larger than the separation distance but smaller than four times that distance.

2. The method as set forth in claim 1 wherein said additive is present in an amount of between about 0.1% and about 1.5% by weight of the liquid crystal composition.

3. The method as set forth in claim 1, further comprising the step of fabricating a coating upon said interior facing surfaces of said substrates to orient the molecules of said liquid composition.

4. The method as set forth in claim 3, further comprising the step of rotating the orientation coatings of the substrates to be substantially perpendicular each to the other.

5. The method as set forth in claim 4, wherein said optically-active additive is present in an amount sufficient to cause a 270° twist in the molecules of said composition between said facing surfaces.

6. The method as set forth in claim 1, wherein said nematic liquid crystal composition is a mixture of cyanophenylbenzoate esters.

* * * * *